(12) United States Patent
Gawade et al.

(10) Patent No.: US 10,113,340 B2
(45) Date of Patent: Oct. 30, 2018

(54) TELL-TALE INDICATOR FOR LOCATING A SECONDARY HOOD LATCH RELEASE

(71) Applicant: GM GLOBAL TECHNOLOGY OPERATIONS LLC, Detroit, MI (US)

(72) Inventors: Tushar Rajaram Gawade, Maharashtra (IN); Masani Sivakrishna, Andhrapradesh (IN)

(73) Assignee: GM Global Technology Operations LLC, Detroit, MI (US)

( * ) Notice: Subject to any disclaimer, the term of this patent is extended or adjusted under 35 U.S.C. 154(b) by 10 days.

(21) Appl. No.: 15/298,279

(22) Filed: Oct. 20, 2016

(65) Prior Publication Data

US 2018/0029528 A1    Feb. 1, 2018

(30) Foreign Application Priority Data

Jul. 27, 2016    (IN) .............................. 201631025700

(51) Int. Cl.
| | |
|---|---|
| E05B 83/24 | (2014.01) |
| B60Q 3/30 | (2017.01) |
| E05B 17/10 | (2006.01) |
| B60Q 1/50 | (2006.01) |
| B60Q 3/14 | (2017.01) |

(52) U.S. Cl.
CPC .............. *E05B 83/24* (2013.01); *B60Q 1/50* (2013.01); *B60Q 3/14* (2017.02); *B60Q 3/30* (2017.02); *E05B 17/10* (2013.01); *E05B 17/106* (2013.01); *Y10S 292/14* (2013.01)

(58) Field of Classification Search
CPC ........ B60Q 1/323; B60Q 3/30; B62D 25/105; B62D 25/12; B62D 25/10; B62D 25/082; B60R 13/04; B60R 21/34; E05B 77/08
See application file for complete search history.

(56) References Cited

U.S. PATENT DOCUMENTS

| | | | | |
|---|---|---|---|---|
| 2,051,892 | A * | 8/1936 | Puttaswamy | ............ B60Q 1/34 116/48 |
| 2,136,948 | A * | 11/1938 | Nyhus | .................... B62D 25/12 292/209 |
| 2,188,335 | A * | 1/1940 | Claud-Mantle | ....... E05B 83/247 180/69.21 |
| 2,193,111 | A * | 3/1940 | Peterson | ............... E05B 83/247 16/293 |
| 2,244,441 | A * | 6/1941 | Arrizabala | .............. E05B 77/46 70/240 |
| 2,253,660 | A * | 8/1941 | Tell | ......................... E05B 83/24 292/128 |
| 2,275,740 | A * | 3/1942 | De Orlow | ............... E05B 83/24 292/220 |
| 2,329,882 | A * | 9/1943 | Clark | ........................ B60Q 1/28 362/311.13 |
| 2,576,857 | A * | 11/1951 | Rose | ..................... B60R 13/005 362/496 |

(Continued)

*Primary Examiner* — Justin B Rephann
(74) *Attorney, Agent, or Firm* — Quinn IP Law

(57) ABSTRACT

A tell-tale indicator for aiding an operator in locating and operating a secondary hood latch release in a gap between a vehicle body and an openable hood includes an indicator configured to locate the secondary hood latch release such that the secondary hood latch release is readily locatable and operable to open the hood. The indicator may be further configured to display an operating direction of the secondary hood latch release.

20 Claims, 4 Drawing Sheets

(56) References Cited

U.S. PATENT DOCUMENTS

| | | | | |
|---|---|---|---|---|
| 2,831,176 A * | 4/1958 | Liberto | ............... | B60Q 1/50 340/468 |
| 4,443,832 A * | 4/1984 | Kanamori | ............... | B60Q 1/26 362/311.13 |
| 4,756,562 A * | 7/1988 | Foster | ............... | E05B 83/24 292/28 |
| 5,709,453 A * | 1/1998 | Krent | ............... | B60Q 1/0011 362/100 |
| 5,779,345 A * | 7/1998 | Adams | ............... | B60Q 1/28 362/459 |
| 6,892,843 B2 * | 5/2005 | Schillaci | ............... | E05C 17/24 180/274 |
| 9,663,967 B2 * | 5/2017 | Salter | ............... | B60Q 3/30 |
| 2009/0091158 A1 * | 4/2009 | Wallman | ............... | B60R 21/34 296/187.04 |
| 2012/0280528 A1 * | 11/2012 | Dellock | ............... | B60R 1/06 296/1.08 |
| 2013/0335994 A1 * | 12/2013 | Mulder | ............... | F21V 9/00 362/555 |
| 2013/0335997 A1 * | 12/2013 | Roberts | ............... | G09F 21/04 362/583 |
| 2015/0138796 A1 * | 5/2015 | Salter | ............... | B60Q 1/0011 362/510 |
| 2016/0016506 A1 * | 1/2016 | Collins | ............... | B60Q 1/268 362/464 |
| 2017/0072848 A1 * | 3/2017 | Salter | ............... | E05B 17/10 |

* cited by examiner

TELL-TALE INDICATOR FOR LOCATING A SECONDARY HOOD LATCH RELEASE

TECHNICAL FIELD

This disclosure relates to a tell-tale indicator for locating a secondary hood latch release.

BACKGROUND

A vehicle may include an openable hood, which is normally latched in a closed position. An operator may open the hood by first unlatching a primary hood latch and then unlatching a secondary hood latch. The primary hood latch may be unlatched by operating a primary hood latch release located in the passenger compartment of the vehicle. The secondary hood latch may be unlatched by operating a secondary hood latch release located in a gap between the body of the vehicle and the hood. When the primary hood latch is unlatched, the hood may open to a partially open position to provide access to the secondary hood latch release. The operator may then unlatch the secondary hood latch by reaching under the partially open hood and operating the secondary hood latch release. When the operator unlatches the secondary hood latch, the hood may be openable to an open position.

SUMMARY

A tell-tale indicator and a vehicle are disclosed herein. The tell-tale indicator is for aiding an operator in locating and operating a secondary hood latch release in a gap between a vehicle body and an openable hood. The tell-tale indicator includes an indicator configured to locate the secondary hood latch release such that the secondary hood latch release is readily locatable and operable to open the hood. The indicator may be further configured to display an operating direction of the secondary hood latch release.

The vehicle includes a body, an openable hood, and a secondary hood latch release. The openable hood is operatively connected to the body and has a tell-tale indicator and an outer surface. The secondary hood latch release is connected to one of the body and the openable hood and is disposed in a gap between the body and the openable hood. The tell-tale indicator is configured to locate the secondary hood latch release such that the secondary hood latch release is readily locatable and operable to open the hood. The indicator may be further configured to display an operating direction of the secondary hood latch release.

The tell-tale indicator and the vehicle disclosed herein aid the operator in locating and operating the secondary hood latch release in the gap between the body and the hood. This disclosure applies to any vehicle, including but not limited to cars, trucks, vans, all-terrain vehicles, busses, boats, trains, airplanes, manufacturing vehicles and equipment, construction vehicles and equipment, maintenance vehicles and equipment, etc.

The above features and advantages and other features and advantages of the present teachings are readily apparent from the following detailed description of the best modes for carrying out the present teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims.

Figure 1:
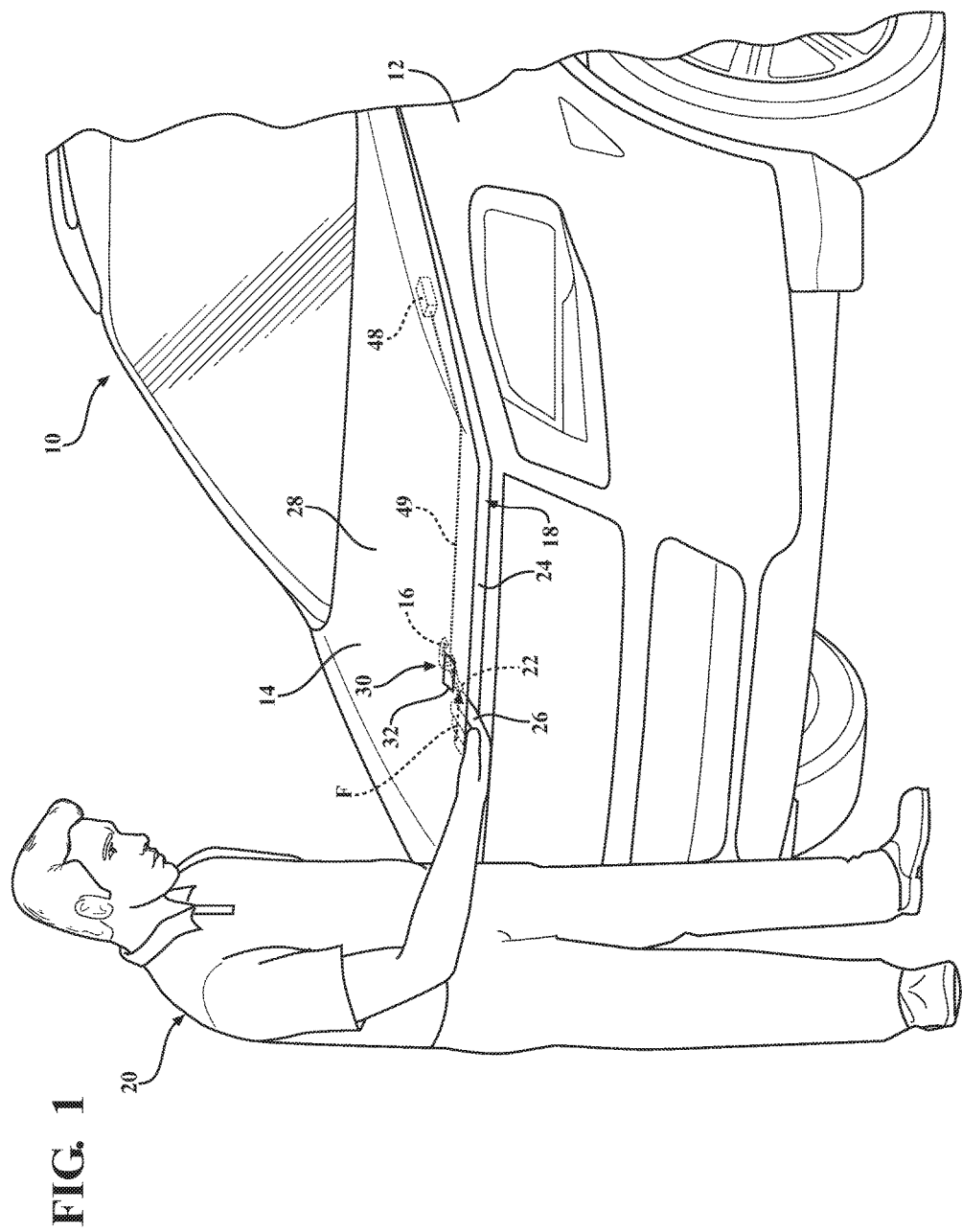
FIG. 1 is a fragmentary, schematic, perspective illustration of a vehicle having an openable hood, a secondary hood latch release, and a tell-tale indicator of this disclosure.

Referring to the drawings, wherein like reference numbers refer to like components throughout the views, FIG. 1 shows a portion of an example vehicle 10. The vehicle 10 includes a tell-tale indicator 30 of the type disclosed herein. While the vehicle 10 of FIG. 1 is a typical example application suitable for the tell-tale indicator 30 disclosed herein, the present design is not limited to vehicular applications. Any stationary or mobile, machine or manufacture may benefit from use of the present design, when properly scaled and configured for the particular application. For illustrative consistency, the vehicle 10 will be described hereinafter as an example system without limiting use of the tell-tale indicator 30 to such an embodiment.

The vehicle 10 includes a body 12, an openable hood 14, and a secondary hood latch release 16. The openable hood 14 is operatively connected to the body 12. For example, the openable hood 14 may be operatively connected to the body 12 via one or more hinges (not shown). The hood 14 has a closed position (not shown), for normal operation of the vehicle 10, a partially open position 18, to be described below, and an open position (not shown), for access to a compartment (not shown), such as a motor compartment or a storage compartment. The compartment may be disposed below and covered by the hood 14 when the hood 14 is in the closed position. The hood 14 may be held in the closed position by a primary hood latch (not shown). The hood 14 has an outer surface 28.

The primary hood latch is connected to the body 12 and is configured to selectively latch the hood 14 to the body 12 in the closed position or unlatch the hood 14 from the body 12. The normal or default state of the primary hood latch may be to latch the hood 14 to the body 12 unless an operator 20 unlatches the primary hood latch. The primary hood latch includes a primary hood latch release (not shown). The primary hood latch release may be located in the passenger compartment (not shown) or in any other suitable area of the vehicle 10.

The secondary hood latch 16 is connected to one of the body 12 and the hood 14 and is configured to selectively latch the hood 14 to the body 12 or unlatch the hood 14 from the body 12. The normal or default state of the secondary hood latch 16 may be to latch the hood 14 to the body 12 unless an operator 20 unlatches the secondary hood latch 16. The secondary hood latch 16 includes a secondary hood latch release 22. The secondary hood latch release 22 is disposed in a gap 24 between the body 12 and the hood 14. The secondary hood latch release 22 may be configured to be operable by the operator 20 to unlatch the secondary hood latch 16 such that the hood 14 is unlatched from the body 12. The secondary hood latch 16 may include a striker (not shown) and a hook (not shown). The striker and the hook may be selectively mounted on the body 12 or the openable hood 14. The striker may be connected to the hood 14 and the hook may be connected to the body 12. Alternatively, the striker may be connected to the body 12 and the hook may be connected to the hood 14. The striker and the hook may be configured to cooperate with one another to selectively latch the hood 14 to the body 12 or unlatch the hood 14 from the body 12. The secondary hood latch release 22 may be configured to be operable by the operator 20 to disengage the hook from the striker such that the hood 14 is unlatched from the body 12.

The operator 20 may open the hood 14 by first unlatching the primary hood latch and then unlatching the secondary hood latch 16. The primary hood latch may be unlatched by operating the primary hood latch release. When the primary hood latch is unlatched, the hood 14 may open to the partially open position 18 to provide access to the secondary hood latch release 22 in the gap 24 between the body 12 and the hood 14, as shown. The hood 14 may be held in the partially open position 18 by the secondary hood latch 16 until the secondary hood latch 16 is unlatched by the operator 20. The secondary hood latch 16 may be unlatched by operating the secondary hood latch release 22, disposed in the gap 24 between the body 12 and the hood 14.

The gap 24 may be large enough to allow only a finger 26 of the operator 20 to extend into the gap 24. The operator 20 may unlatch the secondary hood latch 16 by reaching under the hood 14 with the finger 26 and applying an operating force (arrow F) in an operating direction (arrow F) to the secondary hood latch release 22. When the operator 20 unlatches the secondary hood latch 16, the hood 14 may be openable to the open position, providing access to the compartment disposed below the hood 14.

Figure 3:
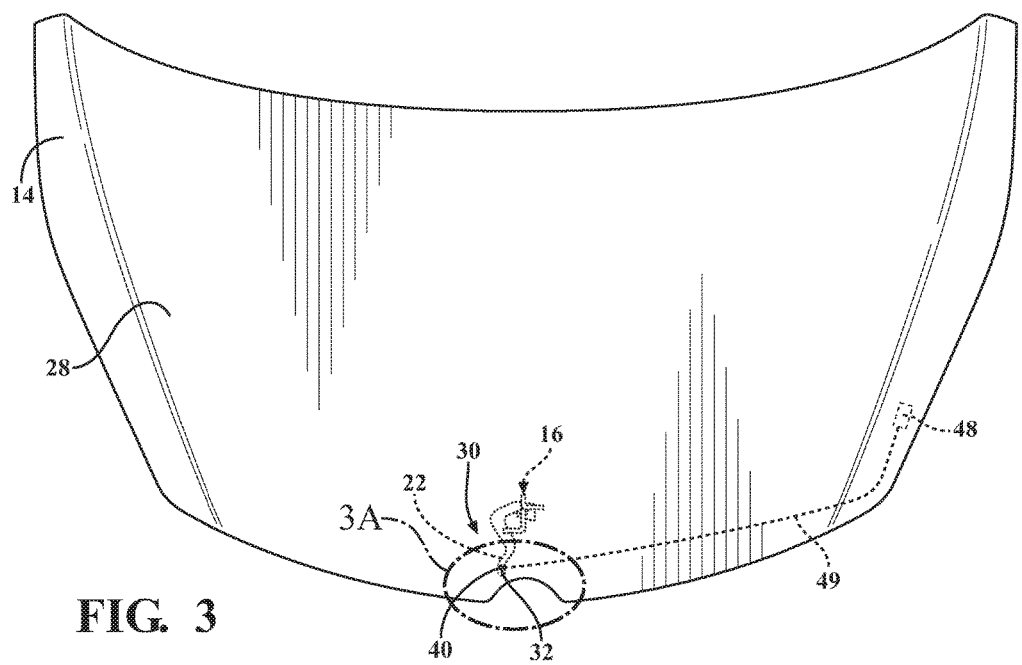
FIG. 3 is a schematic, top view illustration of the tell-tale indicator of FIG. 1, showing the tell-tale indicator including a light source.
Figure 3A:
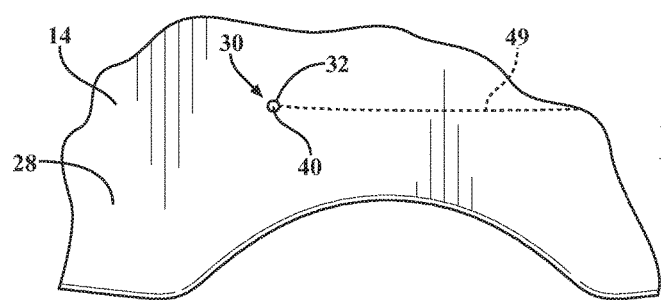
FIG. 3A is a schematic, top view illustration of the tell-tale indicator of FIG. 3, showing greater detail.

The secondary hood latch release 22 may be hidden from the view of the operator 20 by the hood 14, making it very difficult or impossible for the operator 20 to visually locate the secondary hood latch release 22 in the gap 24 between the body 12 and the hood 14. Thus, the operator 20 may be required to use the finger 26 to tactilely locate the secondary hood latch release 22 in the gap 24 between the body 12 and the hood 14 by trial and error probing of the gap 24. This can take a significant amount of time and can cause any dirt, grease, or oil in the gap 24 between the body 12 and the hood 14 to accumulate on the finger 26 of the operator 20. The secondary hood latch release 22 may be a lever, as best seen in FIG. 3. The secondary hood latch release 22 may be configured in any other suitable way.

Referring again to FIG. 1, the secondary hood latch release 22 may be operated by applying the operating force (arrow F) in the operating direction (arrow F) toward the right of the operator 20, as shown, or in any other direction, depending on the configuration of the secondary hood latch release 22. For example, the operating direction (arrow F) may be toward the left of the operator 20, upwards, downwards, toward the operator 20, or away from the operator 20, depending on the configuration of the secondary hood latch release 22. It may be difficult for the operator 20 to determine which direction to apply the force (arrow F) to operate the secondary hood latch release 22 in the gap 24. Thus, the operator 20 may be required to use the finger 26 to apply the operating force (arrow F) to the secondary hood latch release 22 in a variety of directions to determine which direction is the operating direction (arrow F) by trial and error. This can take a significant amount of time and can cause any dirt, grease, or oil in the gap 24 between the body 12 and the hood 14 to accumulate on the finger 26 of the operator 20.

Figure 2:
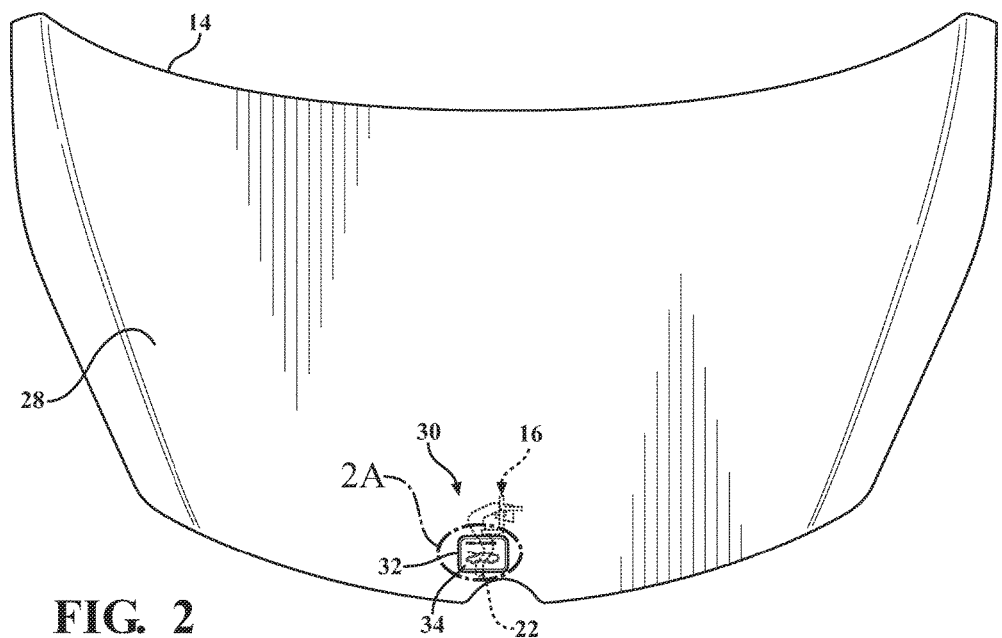
FIG. 2 is a schematic, top view illustration of the tell-tale indicator of FIG. 1, showing the tell-tale indicator including a label.
Figure 4:
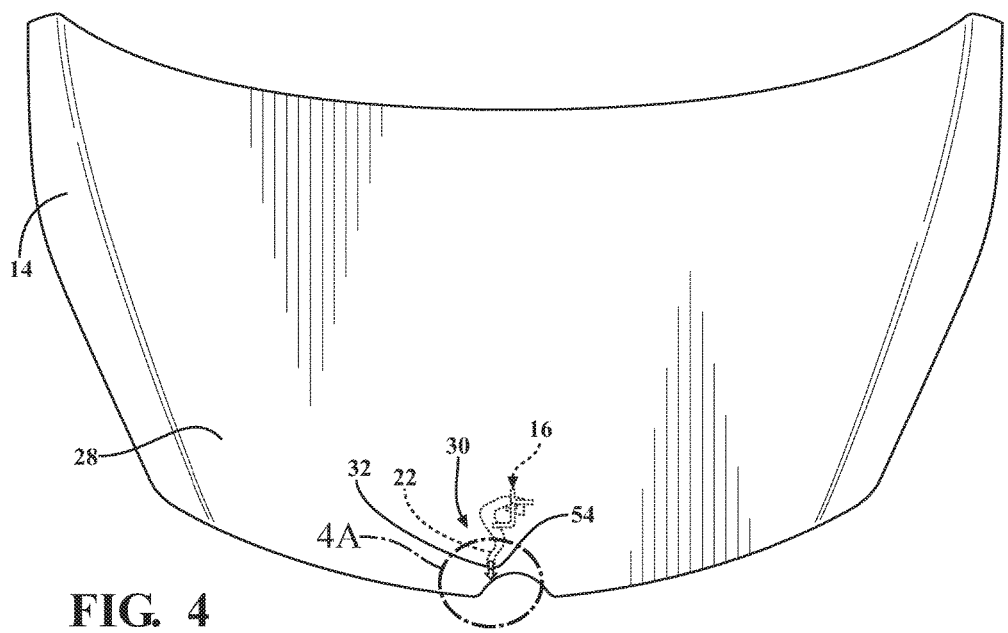
FIG. 4 is a schematic, top view illustration of the tell-tale indicator of FIG. 1, showing the indicator including a protrusion.

The hood 14 includes the tell-tale indicator 30 configured to aid the operator 20 in locating and operating the secondary hood latch release 22 in the gap 24 between the body 12 and the openable hood 14. The tell-tale indicator 30 includes an indicator 32 configured to locate the secondary hood latch release 22 such that the secondary hood latch release 22 is readily locatable and operable to open the hood 14. The indicator 32 may be located directly above the secondary hood latch release 22, as best seen in FIGS. 2, 3, and 4. In other words, a vertical axis, i.e., an axis normal to the ground plane, may pass through both the secondary hood latch release 22 and the indicator 32. The ground plane is defined herein as the plane of the road or ground on which the vehicle 10 travels.

Referring again to FIG. 1, the indicator 32 may be configured to locate the secondary hood latch release 22 such that the secondary hood latch release 22 is readily locatable and operable to open the hood 14 with no trial and error probing of the gap 24 with the finger 26 of the operator 20 in a variety of possible locations to determine the correct location of the secondary hood latch release 22. The indicator 32 may be configured to locate the secondary hood latch release 22 such that the secondary hood latch release 22 is readily locatable and operable to open the hood 14 with no trial and error application of the operating force (arrow F) in a variety of possible operating directions with the finger 26 of the operator 20 to determine the correct operating direction (arrow F) of the secondary hood latch release 22. Trial and error is defined herein as the operator 20 making multiple attempts to determine the location of the secondary hood latch release 22 by probing in multiple possible locations with the finger 26 until the correct location is determined and/or the operator 20 making multiple attempts to determine the operating direction (arrow F) of the secondary hood latch release 22 by applying the operating force (arrow F) in multiple possible operating force directions until the correct operating direction (arrow F) is determined by the operator 20.

Figure 3B:
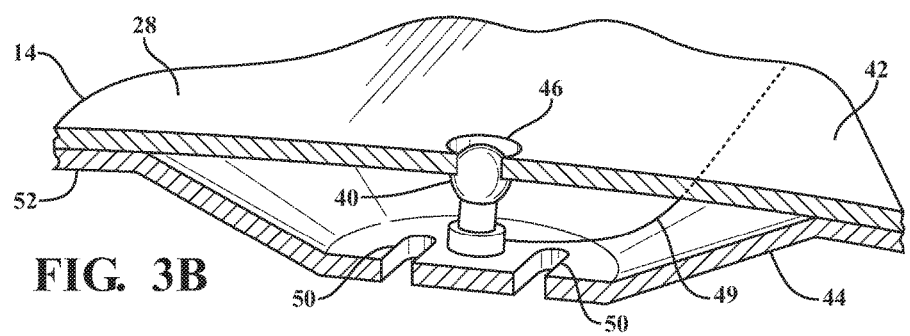
FIG. 3B is a schematic, cross-sectional illustration, partially in elevation, of the tell-tale indicator of FIG. 3.
Figure 4A:
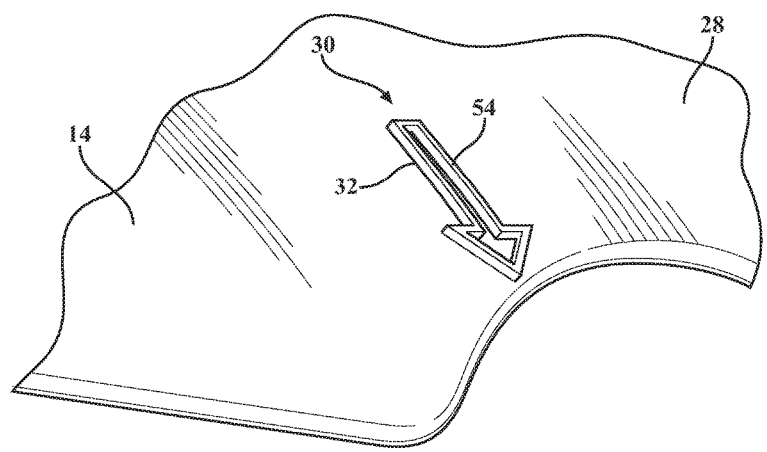
FIG. 4A is a schematic, perspective illustration of the tell-tale indicator of FIG. 4, showing greater detail.

The indicator 32 may be one of a visual indicator, as shown in FIGS. 1-3B, and a tactile indicator, as shown in FIGS. 4-4A. The indicator 32 may be visually or tactilely perceived by the operator 20 on the exterior surface 28 of the hood 14.

Referring now to FIG. 1, the indicator 32 may aid the operator 20 in locating and operating the secondary hood latch release 22 by indicating the position of the secondary hood latch release 22 on the outer surface 28 of the hood 14 above the secondary hood latch release 22. The indicator 32 may be located on the outer surface 28 of the hood 14, above the secondary hood latch release 22. The indicator 32 may further aid the operator 20 in locating and operating the secondary hood latch release 22 by indicating the operating direction (arrow F) of the secondary hood latch release 22. Thus, the operator 20 may insert the finger 26 at the correct location of the secondary hood latch release 22 in the gap 24 and may apply the operating force (arrow F) to the secondary hood latch release 22 in the correct operating direction (arrow F), without any trial and error probing of the gap 24 to determine the location of the secondary hood latch release 22 and without any trial and error application of the operating force (arrow F) to determine the operating direction (arrow F) of the secondary hood latch release 22.

Figure 2A:
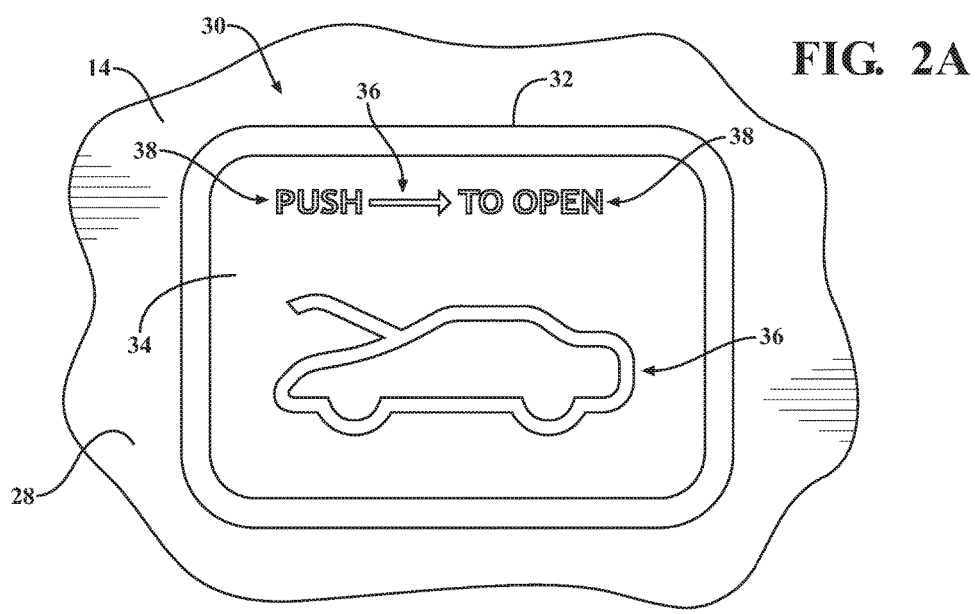
FIG. 2A is schematic, top view illustration of the tell-tale indicator of FIG. 2, showing greater detail.

Referring now to FIGS. 1-2A, the indicator 32 may include a label 34. The label 34 may be a sticker attached to the outer surface 28 of the hood 14. The label 34 may be attached to the outer surface 28 of the hood 14 via an adhesive. The label 34 may be an ink or paint print or stamp on the outer surface 28 of the hood 14, or any other suitable label 34 made by any other suitable process. The label 34 may include a symbol 36. The symbol 36 may indicate the location of the secondary hood latch release 22 in the gap 24 and may indicate the correct operating direction (arrow F) to apply the operating force (arrow F). The symbol 36 may be a standard tell-tale symbol, as understood by those skilled in the art. The label 34 may include text 38. The text 38 may indicate the location of the secondary hood latch release 22 in the gap 24 and may indicate the correct operating direction (arrow F) to apply the operating force (arrow F). The label 34 may include a combination of a symbol 36 and text 38, as shown. Any suitable combination of colors and shades of grey may be used for the label 34. For example, the label 34 may include a clear and/or colored background and may include a black and/or colored symbol and/or text, and a print may include a black and/or colored symbol and/or text.

The label 34 may include a light reflective material, for example a material that includes glass particles or beads. Any other suitable light reflective material may be used. The label 34 may include a luminescent or light emitting material, for example, a material that includes radium. Any other suitable light emitting material may be used.

Referring now to FIGS. 3-3B, the indicator 32 may include a light source 40. A light source is defined herein as a device that emits light and is powered by electricity. The light source 40 may include an incandescent light bulb, a Light Emitting Diode (LED), or any other suitable light emitting device. The hood 14 may include an outer panel 42 and an inner panel 44. The light source 40 may be attached to one of the inner panel 44 and the outer panel 42 of the hood 14 below the outer surface 28 of the hood 14. The outer panel 42 may form an opening 46 configured to allow light emitted from the light source 40 to pass through the outer panel 42 of the hood 14 such that the emitted light is visible to the operator 20 on the outer surface 28 of the hood 14. The opening 46 in the outer pane 42 may be exactly above the secondary hood latch release 22. The opening 46 in the outer panel 42 may be round, as shown. The opening 46 in the outer panel 42 may be any appropriate shape and may include a symbol 36 and/or text 38. Alternatively, the light source 40 may be attached to the outer surface 28 of outer panel 42 of the hood 14 and may be configured in any appropriate shape, including a symbol 36 and/or text 38 shape.

The light source 40 may emit light or be on when the hood 14 is in the partially open position 18. The light source 40 may not emit light or be off when the hood 14 is in the closed position. The light source 40 may not emit light or be off when the hood 14 is in the open position. A position switch 48 may be connected to one of the body 12 and the hood 14 and may control the light source 40, turning the light source 40 on or off, depending on the position of the hood 14. The position switch 48 may be connected to the light source 40 via a wire 49. Alternatively, the position switch 48 may be wirelessly connected to the light source 40. The position switch 48 may provide electric power to the light source 40, via the wire 49, such that the light source 40 is on or emits light when the hood 14 is in the partially open position 18.

The position switch 48 may prevent or disconnect electric power from reaching the light source 40, via the wire 49, such that the light source 40 is off or does not emit light when the hood 14 is in the closed position and when the hood 14 is in the open position. The position switch 48 may have two positions. Alternatively the position switch 48 may have three or more positions.

The light source 40 may be configured to illuminate the secondary hood latch release 22 when the hood 14 is in the partially open position 18. Thus, the operator 20 may be able to visually locate the illuminated secondary hood latch release 22 by bending down or lowering his head and looking into the gap 24 for the secondary hood latch release 22 illuminated by the light source 40. The light source 40 may be attached to one of the inner panel 44 and the outer panel 42 of the hood 14 and may be disposed between the inner panel 44 and the outer panel 42. The inner panel 44 of the hood 14 may form an opening 50 configured to allow light emitted from the light source 40 to pass through the inner panel 44 of the hood 14 such that the light source 40 illuminates the secondary hood latch release 22 in the gap 24. Alternatively, the light source 40 may be attached to an inner surface 52 of the hood 14 such that the light source 40 illuminates the secondary hood latch release 22 in the gap 24.

The indicator 32 may include a protrusion 54 from the outer surface 28 of the hood 14. The protrusion 54 may be tactilely sensed by the operator 20. The protrusion 54 may be visibly sensed by the operator 20. The protrusion 54 may be formed in the hood 14, with the hood 14 and the protrusion 54 being formed as a single, unitary piece. Alternatively, the protrusion 54 may be included in a separate piece that is attached to the hood 14. The protrusion 54 may include a symbol 36. The symbol 36 may be an arrow, as shown, a dot, a circle, or any other suitable symbol. The protrusion 54 may include text 38. The protrusion 54 may include a combination of a symbol 36 and text 38.

The indicator 32 may include a depression (not shown) into the outer surface 28 of the hood 14. The depression may be tactilely sensed by the operator 20. The depression may be visibly sensed by the operator 20. The depression may be formed in the hood 14, with the hood 14 and the depression being formed as a single, unitary piece. Alternatively, the depression may be included in a separate piece that is attached to the hood 14. The depression may include a symbol 36. The symbol 36 may be an arrow, a dot, a circle, or any other suitable symbol. The depression may include text 38. The depression may include a combination of a symbol 36 and text 38.

The indicator 32 may include combinations of two or more of the label 34, the light source 40, the protrusion 54, and the depression. Example combination indicators 32 include, but are not limited to, the label 34 may be illuminated by the light source 40, the label 34 may include a protrusion 54, and the protrusion 54 may be illuminated by the light source 40. Many other combinations of two or more of the label 34, the light source 40, the protrusion 54, and the depression are possible and may be used as appropriate.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An apparatus for aiding an operator having a finger in locating and operating a secondary hood latch release of a secondary hood latch in a gap between a vehicle body and an openable hood having an outer surface, the apparatus comprising:

an indicator located directly above the secondary hood latch release and on the outer surface of the openable hood, and configured to display a location of the secondary hood latch release such that the secondary hood latch release is readily locatable and operable by the operator to open the hood:

wherein the secondary hood latch release is operable by reaching into the gap between the body and the openable hood with the finger and applying an operating force in an operating direction to the secondary hood latch release.

2. The apparatus of claim 1, wherein the indicator includes a label.

3. The apparatus of claim 2, wherein the label includes a symbol.

4. The apparatus of claim 2, wherein the label includes text.

5. The apparatus of claim 1, wherein the indicator includes a light reflective material.

6. The apparatus of claim 1, wherein the indicator includes a light emitting material.

7. The apparatus of claim 1, wherein the indicator includes a light source; and wherein the light source is powered by electricity.

8. The apparatus of claim 7, wherein the light source emits light when the openable hood is in a partially open position.

9. The apparatus of claim 8, wherein the light source does not emit light when the hood is in a closed position.

10. The apparatus of claim 8, wherein the light source is configured to illuminate the secondary hood latch release when the hood is in the partially open position.

11. The apparatus of claim 1, wherein the indicator includes a protrusion.

12. The apparatus of claim 1, wherein the indicator includes a depression.

13. The apparatus of claim 1, wherein the indicator includes at least two of a label, a light source that is powered by electricity, a protrusion, and a depression.

14. The apparatus of claim 1, wherein the indicator is further configured to display an operating direction of the secondary hood latch release.

15. A vehicle, comprising:

a body;

an openable hood connected to the body and having an outer surface;

a secondary hood latch release connected to one of the body and the openable hood and disposed in a gap between the body and the openable hood; and an indicator located directly above the secondary hood latch release and on the outer surface of the openable hood, and configured to display a location of the secondary hood latch release such that the secondary hood latch release is readily locatable and operable by an operator to open the hood, after operating a primary hood latch;

wherein the secondary hood latch release is operable by reaching into the gap between the body and the openable hood with a finger of the operator and applying an operating force in an operating direction to the secondary hood latch release.

16. The vehicle of claim 15, wherein the indicator includes a label attached to the outer surface of the openable hood.

17. The vehicle of claim 15, wherein the indicator includes a light source; and wherein the light source is powered by electricity.

18. The vehicle of claim 17, wherein the light source is configured to illuminate the secondary hood latch release when the openable hood is in a partially open position.

19. The vehicle of claim 15, wherein the indicator includes at least one of a protrusion and a depression.

20. The vehicle of claim 15, wherein the indicator is further configured to display an operating direction of the secondary hood latch release.

* * * * *